2,806,036
Patented Sept. 10, 1957

2,806,036
PROCESS FOR PREPARATION OF IMIDAZOLIDINETHIONES

John D. Christian, Texas City, Tex., assignor to Monsanto Chemical Company, St. Louis, Mo., a corporation of Delaware No Drawing. Application August 22, 1955, Serial No. 529,940

13 Claims. (Cl. 260—309.7)

This invention pertains to certain imidazolidinethiones and to an improved method for their preparation.

Imidazolidinethiones are interesting organic compounds useful as intermediates in many syntheses and particularly in the synthesis of amino acids. Their preparation by the reaction between ketone cyanohydrins and ammonium sulfide has been described by Bucherer and Brandt, J. prakt. Chemie 140, 129–50 (1934). In my co-pending application, Serial No. 521,880, filed July 13, 1955, I have described an improvement over their process whereby excellent yields of imidazolidinethiones are obtained in more practical reaction times by including in the reaction, in addition to the reactants employed by Bucherer and Brandt, at least one molecular proportion of the ketone corresponding to the cyanohydrin used. While this method is a satisfactory and efficient one, I have now discovered a more practical and more flexible method for making these compounds which utlizes more readily available raw materials and which eliminates the necessity for preliminary preparation of the cyanohydrin and/or the use of gaseous hydrogen cyanide with all the hazards attendant upon the storage, transfer and handling of this poisonous gas. According to my invention, imidazolidinethiones are prepared by reacting a ketone with a cyanide salt and an aqueous solution of ammonium sulfide. The reactants are merely brought together at the proper temperature and the product imidazolidinethione is readily recovered from the reaction mixture as a crystalline material in a high state of purity by a simple filtration operation.

The following examples will illustrate the invention but are not to be construed as limiting it in any manner except as it is limited in the appended claims.

Example I

Approximately 0.1 mole (6.5 g.) of potassium cyanide, 0.2 mole of ammonium sulfide (60 g. of a 22.6% aqueous solution) and 50 ml. of water was charged to a round-bottomed reaction flask equipped with a stirrer and thermometer. To this was added dropwise with stirring over a 10-minute period, 0.2 mole (11.6 g.) of acetone. During the addition of acetone the contents of the flask was heated gradually so that the temperature of the reaction mixture rose from about 30° C. to about 40° C. After addition of the reactants was completed, the temperature of the reaction mixture was raised to about 50° C. and maintained at that level for one hour. It was then cooled and filtered to recover 6.5 g. of crystalline 2,2,5,5-tetramethyl-4-imidazolidinethione with a melting point of 152–3° C. After subjection to evaporation and crystallization, the filtrate liquor yielded another 1.5 g. of the crystalline product with the same melting point, thus representing a yield of 53% of the theoretical. The melting point of a mixture of this reaction product and pure 2,2,5,5-tetramethyl-4-imidazolidinethione was identical with that of the pure product.

Example II

The following materials were charged to a 2-liter, round-bottomed reaction flask: 1.5 moles of ammonium sulfide (450 g. of a 22.6% aqueous solution); 1 mole (65 g.) of potassium cyanide; 1 mole (54 g.) of ammonium chloride and 250 ml. of methanol. While the flask was heated gradually and its contents were continually stirred, 2.0 moles (196.2 g.) of cyclohexanone was slowly added to the mixture from a dropping funnel over a period of about 45 minutes. After the cyclohexanone was all added and the reaction temperature had reached about 55° C., the mixture was stirred for about one hour while the temperature was maintained at about 50–55° C. At the end of that time, the reaction mixture was cooled and filtered and the crystalline product was air dried. Approximately 201 g. of the compound, diaza-7,14-dispiro [5.1.5.2] pentadecanethione-15 with the folowing structure

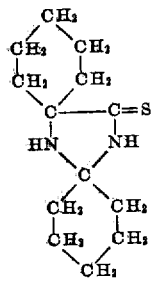

and having a melting point of 225–226° C. was produced. An additional 24 g. of light yellow colored crystals having a melting point from 222–226° C. was recovered by crystallization from the filtrate liquor after it had been reduced to about one-half of its volume by evaporation. The total product represents a yield of 94.4% of the theoretical and the purity of the product was such that a mixture of it with some of the pure diaza-7,14-dispiro [5.1.5.2] pentadecanethione-15 did not result in any depression in melting point over that of the pure material.

Some variations from the procedure given in the examples may be made in practicing the invention without departing from the scope thereof. For example, considerable latitude in temperature is permissible. Any temperature in the range from room temperature (20° C.) to about 100° C. may be employed. The reaction is, however, preferably carried out at a temperature from about 35° C. to about 55° C.

The stoichiometric quantities of reactants, i. e., two moles of the ketone and one mole of each of the other two reactants may be employed. However, as may be seen from the following equation for the typical reaction as exemplified with acetone,

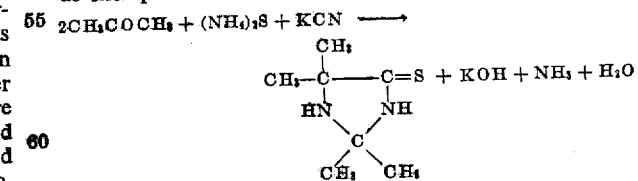

when equimolar quantities of ammonium sulfide and the cyanide salt are used, the hydroxide corresponding to the salt employed is one of the products. In actual practice, the hydroxide so produced probably reacts with the ammonium sulfide, removing it and preventing it from forming more of the imidazolidinethione, thus reducing the yield of the latter and desired compound. This may be obviated by employing an excess of the ammonium sulfide reactant so that the reaction shown above would then proceed as follows:

$$2CH_3COCH_3 + 1.5\,(NH_4)_2S + KCN \longrightarrow$$

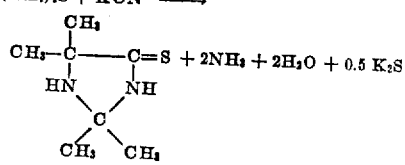

$$+ 2NH_3 + 2H_2O + 0.5\,K_2S$$

Alternatively, a "buffer" can be added to the reaction mixture to combine with the hydroxide as it is formed, as is demonstrated in Example II wherein ammonium chloride is used for this purpose. Other "buffers" suitable for this purpose include ammonium salts such as ammonium sulfate, ammonium carbonate, ammonium acetate, and the like.

In addition to the potassium cyanide used in the examples, other cyanide salts useful in the process are the other alkali metal cyanides, such as sodium and lithium cyanide; the alkaline earth metal cyanides such as calcium cyanide, barium cyanide, magnesium cyanide and the like; and ammonium cyanide.

The reaction may be carried out in alcoholic as well as in aqueous medium. Methanol, ethanol, isopropanol and the like may be used as reaction media to insure that the reaction mixture remains workable, i. e., its consistency is such that the mass, as the crystalline product forms, may be agitated sufficiently to insure the contact of reactants necessary to effect complete conversion.

Suitable ketones, in addition to those mentioned in the examples, to which the invention is applicable include symmetrical and asymmetrical aliphatic ketones such as diethyl ketone, methyl ethyl ketone, methyl propyl ketone, methyl isopropyl ketone, diisopropyl ketone, ethyl isopropyl ketone, methyl butyl ketone, methyl isobutyl ketone, and the like; cycloaliphatic ketones and their derivatives such as cyclopentanone, 2-methylcyclohexanone, 2,3-dimethylcyclohexanone, 2-methylcyclopentanone and the like; aryl substituted aliphatic ketones or mixed aromatic-aliphatic ketones such as acetophenone, methyl benzyl ketone, methyl naphthyl ketone and the like.

What is claimed is:

1. An improved process for the preparation of imidazolidinethiones which comprises reacting, at temperatures from about 20° C. to about 100° C., a ketone chosen from the group consisting of ketones of the formula

wherein R and R′ are chosen from the group consisting of unsubstituted alkyl, cycloalkyl, aryl, alkaryl, and aralkyl radicals with a cyanide salt chosen from the group consisting of the alkali metal cyanides, the alkaline earth metal cyanides and ammonium cyanide and ammonium sulfide.

2. An improved process for the preparation of imidazolidinethiones which comprises reacting, at temperatures from about 35° C. to about 55° C., a ketone chosen from the group consisting of ketones of the formula

wherein R and R′ are chosen from the group consisting of unsubstituted alkyl, cycloalkyl, aryl, alkaryl, and aralkyl radicals with a cyanide salt chosen from the group consisting of the alkali metal cyanides, the alkaline earth metal cyanides and ammonium cyanide and ammonium sulfide.

3. An improved process for the preparation if imidazolidinethiones which comprises heating together at temperatures from about 35° C. to about 55° C., two moles of a ketone chosen from the group consisting of ketones of the formula

wherein R and R′ are chosen from the group consisting of unsubstituted alkyl, cycloalkyl, aryl, alkaryl, and aralkyl radicals with one mole of a cyanide salt chosen from the group consisting of the alkali metal cyanides, the alkaline earth metal cyanides and ammonium cyanide and an amount of ammonium sulfide in excess of one mole, and recovering the imidazolidinethione formed from the reaction mixture.

4. An improved process for the preparation of imidazolidinethiones which comprises reacting, at temperatures from about 35° C. to about 55° C., stoichiometric proportions of a ketone chosen from the group consisting of ketones of the formula

wherein R and R′ are chosen from the group consisting of unsubstituted alkyl, cycloalkyl, aryl, alkaryl, and aralkyl radicals, a cyanide salt chosen from the group consisting of the alkali metal cyanides, the alkaline earth metal cyanides, and ammonium cyanide, and ammonium sulfide in the presence of an ammonium salt chosen from the group consisting of ammonium chloride, ammonium sulfate, ammonium carbonate and ammonium acetate as a buffer, and recovering the imidazolidinethione formed from the reaction mixture.

5. An improved process for the preparation of imidazolidinethiones which comprises reacting, at temperatures from about 20° C. to about 100° C., a cycloaliphatic ketone with a cyanide salt chosen from the group consisting of the alkali metal cyanides, the alkaline earth metal cyanides, and ammonium cyanide and ammonium sulfide.

6. An improved process for the preparation of imidazolidinethiones which comprises reacting, at temperatures from about 35° C. to about 55° C., a cycloaliphatic ketone with a cyanide salt chosen from the group consisting of the alkali metal cyanides, the alkaline earth metal cyanides, and ammonium cyanide and ammonium sulfide.

7. An improved process for the preparation of imidazolidinethiones which comprises reacting, at temperatures from about 35° C. to about 55° C., a cycloaliphatic ketone, a cyanide salt chosen from the group consisting of the alkali metal cyanides, the alkaline earth metal cyanides, and ammonium cyanide, and ammonium sulfide in the presence of an ammonium salt chosen from the group consisting of ammonium chloride, ammonium sulfate, ammonium carbonate and ammonium acetate as a buffer, and recovering the imidazolidinethione formed from the reaction mixture.

8. An improved process for the preparation of 2,2,5,5-tetramethyl-4-imidazolidinethione which comprises reacting, at temperatures from about 20° C. to about 100° C., acetone, potassium cyanide, and ammonium sulfide.

9. An improved process for the preparation of 2,2,5,5-tetramethyl-4-imidazolidinethione which comprises reacting, at temperatures from about 35° C. to about 55° C., acetone, potassium cyanide, and ammonium sulfide in the presence of ammonium chloride as a buffer, and recovering the 2,2,5,5-tetramethyl-4-imidazolidinethione formed from the reaction mixture.

10. An improved process for the preparation of diaza-7,14-dispiro [5.1.5.2] pentadecanethione-15 which comprises reacting, at a temperature from about 20° C. to about 100° C., cyclohexanone, potassium cyanide, and ammonium sulfide.

11. An improved process for the preparation of diaza- 7,14-dispiro [5.1.5.2] pentadecanethione-15 which comprises heating together at temperatures from about 35° C. to about 55° C., two moles of cyclohexanone, one mole of potassium cyanide, and an amount of ammonium sulfide in excess of one mole, and recovering the diaza-7,14-dispiro [5.1.5.2] pentadecanethione-15 formed from the reaction mixture.

12. An improved process for the preparation of diaza-7,14-dispiro [5.1.5.2] pentadecanethione-15 which comprises reacting, at temperatures from about 35° C. to about 55° C., cyclohexanone, potassium cyanide, and ammonium sulfide in the presence of ammonium chloride as a buffer, and recovering the diaza-7,14-dispiro [5.1.5.2] pentadecanethione-15 formed from the reaction mixture.

13. An improved process for the preparation of imidazolidinethiones which comprises reacting (1) a ketone chosen from the group consisting of ketones of the formula

wherein R and R' are chosen from the group consisting of unsubstituted alkyl, cycloalkyl, aryl, alkaryl, and aralkyl radicals and ketones of the formula R''=C=O wherein R'' is a cycloaliphatic radical with (2) a cyanide salt chosen from the group consisting of the alkali metal cyanides, the alkaline earth metal cyanides and ammonium cyanide and (3) ammonium sulfide.

No references cited.

UNITED STATES PATENT OFFICE
Certificate of Correction

Patent No. 2,806,036                                                      September 10, 1957

John D. Christian

It is hereby certified that error appears in the printed specification of the above numbered patent requiring correction and that the said Letters Patent should read as corrected below.

Column 2, line 18, for "folowing" read —following—; column 3, lines 48 to 52, inclusive, claim 1, the formula should appear as shown below instead of as in the patent—

column 3, line 73, claim 3, for "preparation if" read —preparation of—.

Signed and sealed this 8th day of April 1958.

[SEAL]

Attest:
KARL H. AXLINE,
*Attesting Officer.*

ROBERT C. WATSON,
*Commissioner of Patents.*